UNITED STATES PATENT OFFICE.

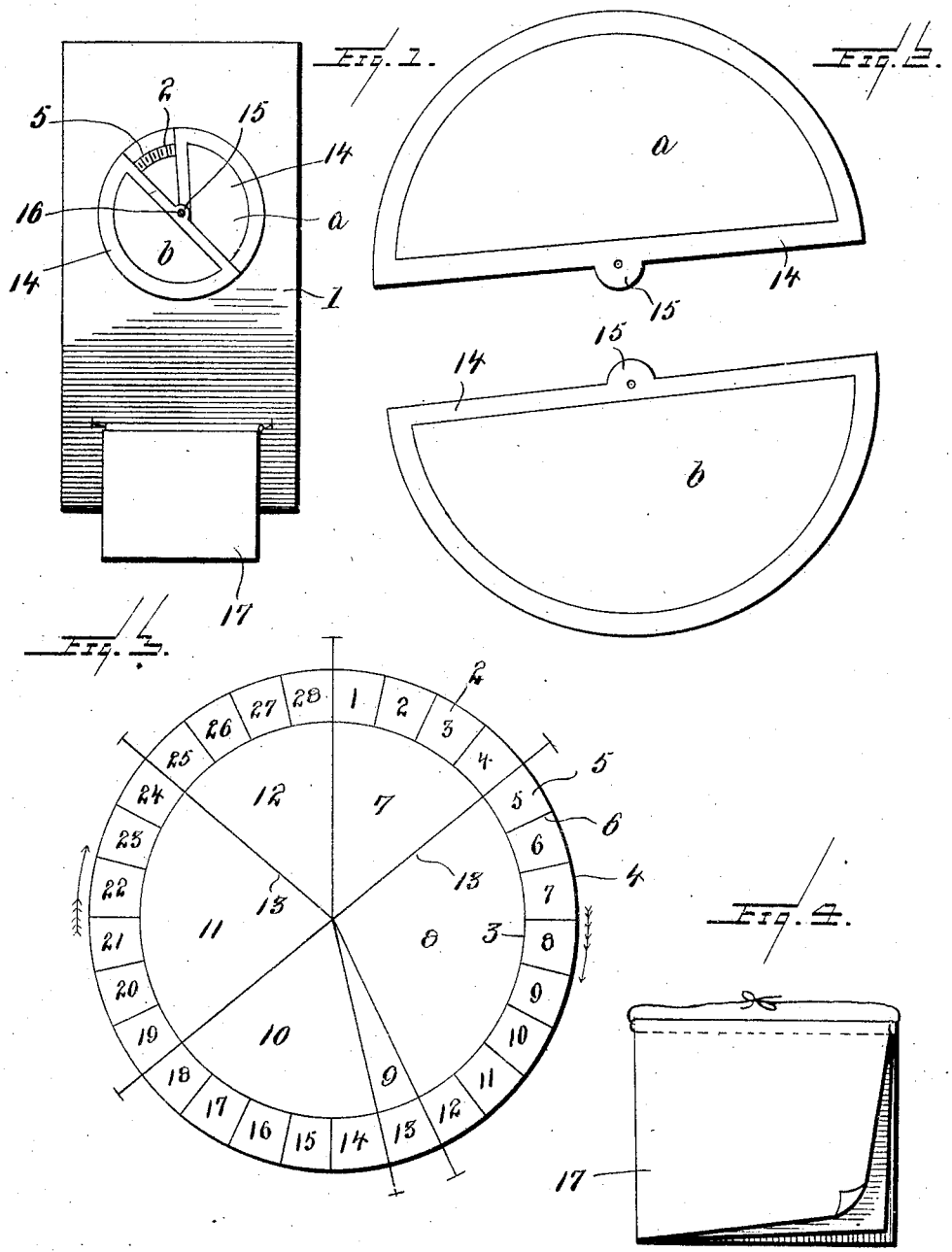

GIUSEPPE CASALE, OF SALTILLO, MEXICO.

LUNAR CALENDAR.

No. 853,959.     Specification of Letters Patent.     Patented May 21, 1907.

Application filed October 20, 1906. Serial No. 339,761.

*To all whom it may concern:*

Be it known that I, GIUSEPPE CASALE, a subject of the King of Italy, residing at Saltillo, State of Coahuila, Mexico, have invented a new and useful Improvement in Lunar Calendars, of which the following is a specification.

My invention relates to improvements in calendars, and pertains particularly to a diagrammatical calendar of the lunar month representing in subdivisions of different colors the several periods of the month relating to the menstruation of women.

The object of my invention is to provide a device of this character which may be readily adjusted so that only a portion of the diagrammatical chart or calendar is exposed to view, while the remainder of same is covered.

In the accompanying drawings illustrating my invention, Figure 1 is a front elevation of the calendar with a portion of the lunar chart exposed; Fig. 2 is a detail view of the segmental disk or shutter covering the calendar chart; Fig. 3 is a diagrammatical view of the calendar chart, and Fig. 4 is a detail view of the book or pad.

My invention includes generally, a circular chart which is divided into twenty-eight parts representing the days of the lunar month, which are arranged into six sections by radial lines which sections may be differently colored, a segmental shutter pivoted in the center of the circular chart, and a book or pad attached to the chart.

Referring to the accompanying drawings, 1 designates a rectangular board, preferably of thick card board, on which is printed or traced the lunar chart 2. Said chart comprises the two concentric circles 3 and 4, the former being of a smaller diameter than the latter, which together form a circular band 5. The said circular band is divided into twenty-eight equal parts by radial lines 6 which represent the days of the lunar month. The circular chart is also divided into six segmental sections 7, 8, 9, 10, 11 and 12, of different sizes, which classify the days of the month into irregular periods relating to the varying conditions of the human ovum by radial lines 13 running from the center of the chart.

The segmental shutter 14 is pivotally mounted concentrically on the chart 2. Said shutter, as shown in the drawings, comprises two semi-circular sections *a* and *b* having on the straight edge of each a perforated ear 15. The shutters are pivotally mounted on the chart by the pin 16, which passes through the perforations in the ears 15 and pierces the chart at its center and is riveted or otherwise secured on the back of the board.

It will be seen that one of the sections of the shutter is mounted above the other, so that by rotation upon the pivot, they will telescope, thus exposing any portion of the chart less than a half circle, in which adjustment they will be held by frictional contact with the board and each other thereby sharply demarking the periods before mentioned.

Secured by a cord or otherwise, the pamphlet 17 containing printed instructions for the use of the chart is mounted on the board 1 beneath the chart 2.

My invention will be readily understood upon reference to the foregoing description and the accompanying drawings, and it will be appreciated that the parts and combinations may be varied without departing from the spirit and scope of the invention.

Having thus described my invention, what I claim is—

1. A lunar calendar, comprising a chart formed of a circular band divided into parts representing the days of the lunar month, and a sectional segmental shutter centrally pivoted on the chart and adjustable to expose a part of said chart.

2. A lunar calendar, comprising a circular chart having a circular band about the perimeter thereof, said band being divided into parts representing the days of the lunar month, said chart being also divided into six irregular divisions by radial lines, and a sectional segmental shutter centrally pivoted on the chart and adjustable to expose one only of any of said irregular divisions.

3. A lunar calendar, comprising a circular chart divided into segments representing the days of the lunar month, a shutter composed of two semi-circular segments pivotally secured at the center of the chart adapted to adjustably telescope each other and expose sections of the chart.

In testimony whereof I have signed my name to this specification in the presence of two subscribing witnesses.

GIUSEPPE CASALE.

Witnesses:
   N. S. FAUCETT,
   RAOUL F. LE MAT.